Patented Apr. 18, 1933

1,904,946

UNITED STATES PATENT OFFICE

OTTO KIPPE, OF OSNABRUCK, GERMANY, ASSIGNOR OF ONE-HALF TO KLOCKNER-WERKE A.-G., OF CASTROP-RAUXEL, GERMANY, A CORPORATION OF GERMANY

PRODUCING CALCIUM NITRATE FROM DOLOMITE WHILE SIMULTANEOUSLY OBTAINING MAGNESIA

No Drawing. Application filed March 29, 1932, Serial No. 601,878, and in Germany March 3, 1931.

This invention relates to a method of producing calcium nitrate from dolomite while simultaneously obtaining magnesia.

It has been proposed already to produce calcium nitrate from dolomite and to obtain also magnesia therefrom by dissolving dolomite in nitric acid, precipitating magnesia from the solution by means of lime, especially in the form of burnt dolomite, filtering it off, subjecting it to further treatment, and exposing the filtrate to evaporation to produce solid calcium nitrate.

It has further been proposed to produce calcium nitrate and to obtain, at the same time, magnesia by treating burnt dolomite with nitric acid corresponding in quantity to that of the lime present, and then to separate the lime from the magnesia by dissolving it out.

The known methods, however, have not attained practical importance, for experiments have shown that it is not possible to keep the magnesia free from lime to a sufficient degree and to obtain a really useful grade of calcium nitrate. For industrial use, the lime contents of magnesia must not exceed 4%, while calcium nitrate containing magnesium nitrate is rendered still more hygroscopic and becomes unfit for fertilizing purposes.

The invention eliminates these drawbacks in a simple and economical way by employing for precipitating the magnesia from the dolomite dissolved in nitric acid, or for dissolving the lime out of the burnt and slaked dolomite, milk of lime or milk of dolomite that has previously been filtered through fine sieves or from which all particles except the very fine ones have been removed by suitable centrifugal devices. Ordinary milk of lime or dolomite obtained by slaking quicklime or burnt dolomite leaves, for example, a residue of 10% and more on a sieve having 4900 meshes, and it has been found that this is the reason why magnesia during the precipitating or dissolving step cannot be kept deficient in lime, as the coarser particles react only on the surface. Furthermore, the calcium nitrate already formed will have a gel-forming effect upon the magnesium hydroxide.

According to the invention, the precipitating or dissolving process can be carried out in a simple and perfect manner to obtain both magnesia deficient in lime and pure calcium nitrate.

Example 1

100 kilos of raw dolomite of 31% CaO and 20% MgO contents are dissolved in 300 liters nitric acid having a specific gravity of 1.2. To this solution 190 liters milk of lime are added while stirring, which contains 140 grams CaO per liter and has been filtered through a sieve of 4900 meshes. Conversion takes place quickly and perfectly. The precipitated magnesium hydroxide is separated from the calcium nitrate lye by means of a filter press or suction filter and washed out with water to which nitrate solution or diluted nitric acid has been added if necessary until the washing water shows a specific gravity of 1.01. The magnesium hydroxide is dried, calcined or sintered as required.

The yield amounts to about 20 kilos magnesia which, according to its composition or the addition of ferrous salts to the dolomite solution, contains the requisite amounts $Fe_2O_3$ or other sinter substances. It is easy to keep the lime content below 3% and even below 1%. The filtrate is then subjected in the known way to evaporation to obtain solid calcium nitrate, 164 kilos of which possessing a high degree of purity being thus obtained from 100 kilos dolomite.

Precipitation is carried out preferably so as to keep the temperature below 50°, the dolomite solution and the milk of lime or dolomite being cooled off previously. This has to be done for the reason that during conversion heat is developed which, at higher temperatures, will have an unfavorable effect upon the magnesium hydroxide by rendering it more voluminous and more difficult to filter.

*Example 2*

100 kilos of raw dolomite of 34% CaO and 18% MgO contents are dissolved in 300 liters nitric acid. In the meantime, 40 kilos burnt dolomite are slaked in about 175 liters of water and passed through a 4900 mesh sieve. This milk is then added while stirring to the dolomite solution mentioned above, whereupon the magnesia is separated from the calcium nitrate lye by means of a filter press, suction filter or the like. The yield amounts to 31 kilos magnesia, since the magnesia from the dolomite milk must be counted also. This magnesia, too, is deficient in lime and contains only 0.8–3% thereof, so that it is very useful. The yield of calcium nitrate amounts to 167 kilos.

During the production of milk of dolomite a considerable residue is left after the fine sieving step, which is preferably dissolved in nitric acid and used as nitrate solution.

On the other hand, if, for special reasons, such as to save freight, burnt dolomite is used exclusively both for dissolution in nitric acid and for precipitation, the operation is preferably carried on so that the burnt dolomite is slaked in water and, after settling, the milk of dolomite passed through the sieve in quantities corresponding approximately to one-half of the amount of dolomite used. The rest, which contains burnt, overburnt and unburnt parts, is dissolved in nitric acid together with the residue, and to this solution is then added the strained milk of dolomite, after cooling if necessary, or the nitric acid solution of dolomite may be added to the strained milk of lime or dolomite.

*Example 3*

3.4 kilos of burnt dolomite of 63% CaO and 33% MgO contents are slaked with 10 liters of water to form milk of dolomite which is then passed through a 4900 mesh sieve. To this milk, which preferably is cooled down to 20° centigrade or less, 7 liters of nitric acid having a specific gravity of 1.32 are gradually added under constant stirring and good cooling. The lime will dissolve in the form of calcium nitrate while the magnesia remains undissolved in coagulated condition. The magnesia or magnesium hydroxide is separated from the calcium nitrate lye by means of a filtering cloth, suction filter or filter press and washed with water until the washing liquid has a specific gravity of 1.01, which requires about 5 liters of water. The residue is dried, calcined, sintered, and subjected to further treatment as required. The filtrate is turned into calcium nitrate by evaporation or, by means of alkali sulfates or alkali chlorides, converted into alkali saltpeter for which this calcium nitrate is particularly suited on account of its high degree of purity.

The yield of magnesia and calcium nitrate are almost quantitative, the magnesia having only 1.01% CaO contents.

The sifting residue is utilized by preferably dissolving it in the nitric acid.

I claim:—

1. A method of producing calcium nitrate, and simultaneously obtaining magnesia, from dolomite, consisting in dissolving the dolomite in nitric acid and precipitating magnesia by means of a material in the group consisting of milk of lime and of dolomite, the milk having previously been filtered through fine sieves.

2. A method of producing calcium nitrate, and simultaneously obtaining magnesia, from dolomite, consisting in dissolving the dolomite in nitric acid and precipitating magnesia by means of a material in the group consisting of milk of lime and of dolomite, the milk having previously been freed from all except the finest particles by suitable devices.

3. A method as claimed in claim 1, according to which the dolomite is first burnt, slaked and then treated with nitric acid.

4. A method as claimed in claim 2, according to which the dolomite is first burnt, slaked and then treated with nitric acid.

In testimony whereof I have affixed my signature.

OTTO KIPPE.